No. 683,919. Patented Oct. 8, 1901.
C. H. EMERY.
DRIER.
(Application filed Sept. 25, 1900.)
(No Model.) 2 Sheets—Sheet 1.
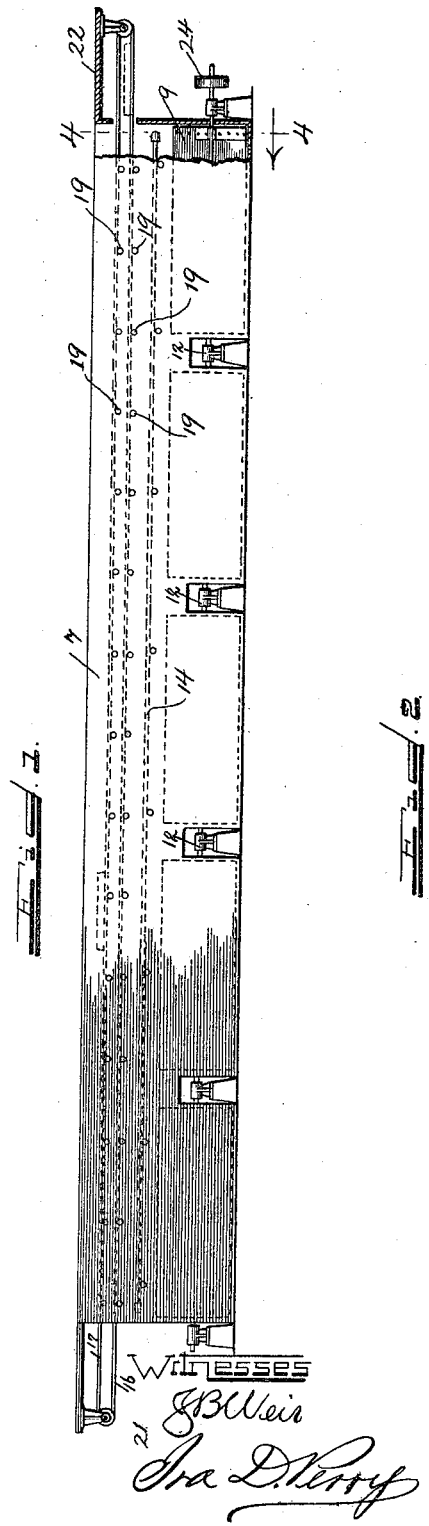
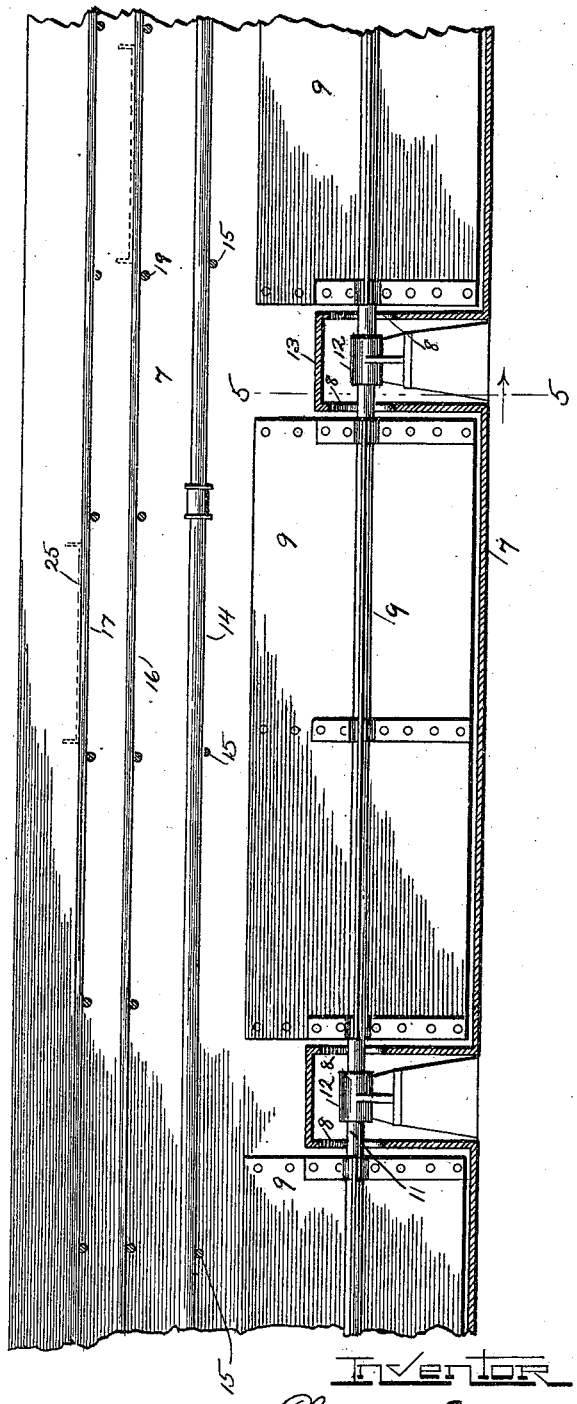

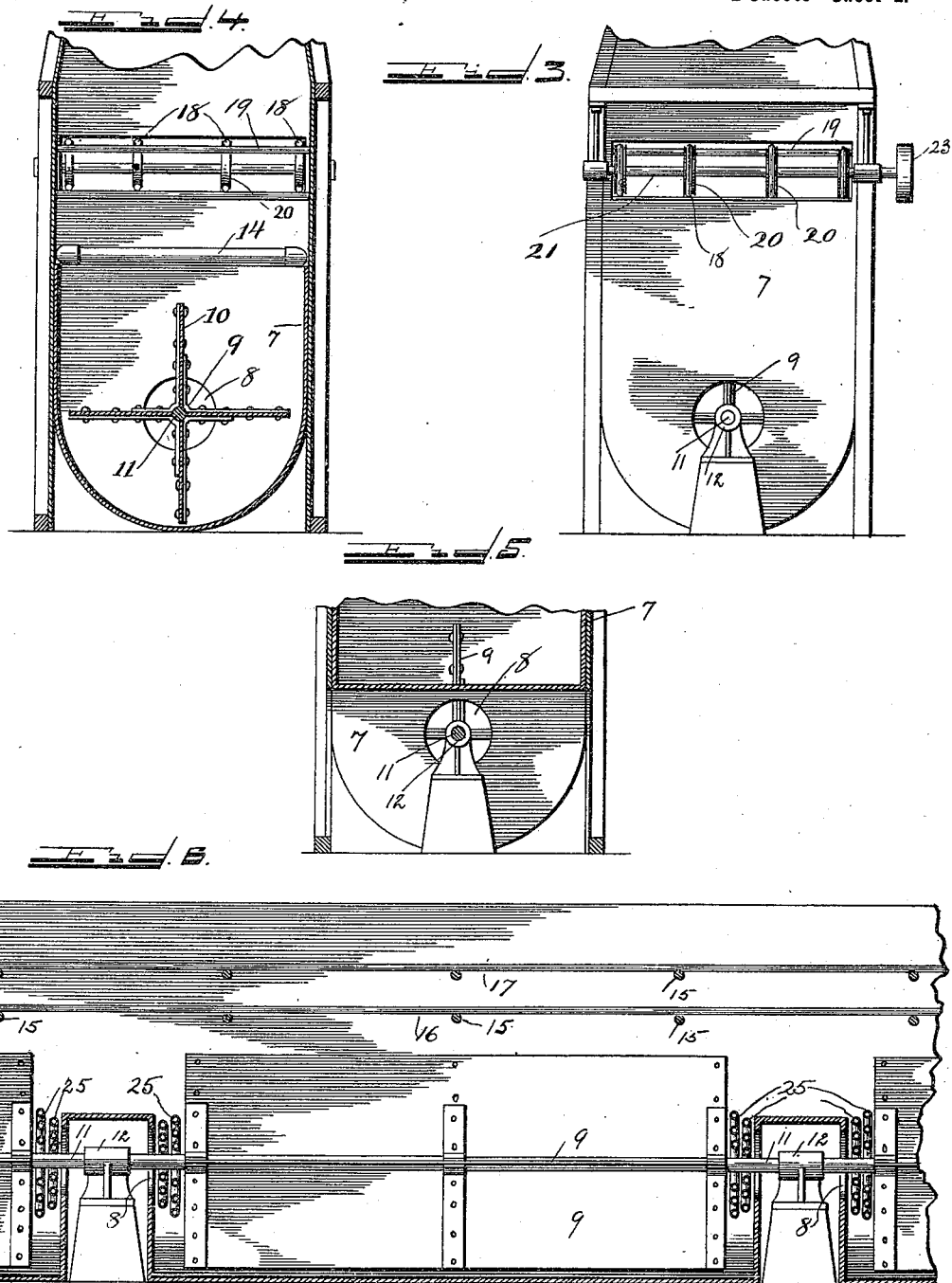

UNITED STATES PATENT OFFICE.

CHARLES H. EMERY, OF EASTPORT, MAINE, ASSIGNOR TO SEA COAST PACKING COMPANY, OF SAME PLACE.

DRIER.

SPECIFICATION forming part of Letters Patent No. 683,919, dated October 8, 1901.

Application filed September 25, 1900. Serial No. 31,113. (No model.)

*To all whom it may concern:*

Be it known that I, CHARLES H. EMERY, a citizen of the United States, residing at Eastport, in the county of Washington and State of Maine, have invented certain new and useful Improvements in Driers, of which the following is a specification, reference being had to the accompanying drawings.

My invention relates to drying apparatus, and has for its object to produce a drier which will be well adapted for use in drying fish and other matter of similar character and which will operate much more rapidly and effectively than driers heretofore in use for such purposes. This object I accomplish as hereinafter described and as illustrated in the drawings.

What I regard as new will be set forth in the claims.

In the accompanying drawings, which illustrate two forms of my improved apparatus, Figure 1 is a side elevation, some parts being in section. Fig. 2 is a longitudinal sectional view of the preferred form of apparatus. Fig. 3 is an end view. Fig. 4 is a vertical section on line 4 4 of Fig. 1. Fig. 5 is a section on line 5 5 of Fig. 2, and Fig. 6 is a longitudinal sectional view indicating a modified arrangement of the steam-coil and carrier.

In the apparatus, as illustrated in the drawings, a plurality of blowers is shown arranged in line with each other, each of said blowers consisting of a casing 7, open at the top and having annular openings 8 at its ends, in each of which casings is a fan 9. Said fans, as illustrated, consist of a series of blades 10, radiating from a central axis. Said fans are mounted on a shaft 11, which in the best form of apparatus extends through a series of casings and is mounted in bearings 12, arranged between the ends of adjacent casings, as shown in Fig. 2. The bearings 12 are best inclosed partially, which I accomplish by providing coverings 13, which connect the ends of the adjacent casings, as shown in Fig. 2. At the sides the bearings are not inclosed in order to permit air to enter the casings freely. In operation the shaft 11 is rotated at a high rate of speed, causing the fans to draw in the air through the openings 8 and discharge it in an upward direction.

14 (see Figs. 1, 2, and 4) indicates a series of steam-pipes which extend over the blowers. A number of such pipes are provided, arranged parallel with each other, so that the air rising from the blowers passes through the steam-pipes in close contact therewith and is heated thereby.

15 indicates a series of cross-bars which support the steam-pipes 14.

16 17 indicate lower and upper conveyers, respectively, the conveyer 17 being arranged immediately over and a short distance from the conveyer 16, both of the conveyers being over the steam-pipes 14 in the path of the rising air. The conveyers 16 17 are best formed by a series of endless belts 18, supported by cross-bars 19 and running on pulleys 20, mounted on transverse shafts 21, as shown in Figs. 3 and 4, said shafts being arranged at the ends of a suitable frame 22, as shown in Fig. 1. The belts 18 are driven from any suitable source of power by rotating the pulleys 20. This is best accomplished by providing one of the shafts 21 with a pulley 23 and connecting it with a suitable source of power. The fan-shaft 11 is also provided with a pulley 24, which may be driven from the same source of power.

From the foregoing description it will be noted that the conveyers 16 17 move in opposite directions through the heated air, and in operation the fish are placed in suitable trays or pans 25, which rest on the conveyers and are carried first in one direction through the heated air rising from the fans and then back in the opposite direction. In practice the fish are first placed on the upper conveyer 17, where the greater proportion of the moisture is driven off. When the pans arrive at the end of the drier opposite that at which they entered it, they are removed by an attendant and placed upon the upper surface of the lower conveyer 16 and carried back through the heated air again. At this time as they are comparatively dry the escaping moisture does not affect the fish on the upper conveyer, which already contain much more moisture than the fish on the lower conveyer. By the time the fish arrive back at the starting-point they are thoroughly dry. The whole operation consumes only a few minutes and is very much quicker than in constructions heretofore employed.

Where it is desired to have the conveyers closer to the fans than is possible where the steam-pipes are arranged between the conveyers and the fans, the steam-pipes are placed at the ends of the fans opposite the openings 8, as shown in Fig. 6. By this construction the air passing through the openings 8 is subjected to the action of the heated pipes and heated to the desired temperature. As shown in Fig. 6, this construction permits of lowering the conveyers 16 17, so that they may be placed nearer the fans. Ordinarily where a greater area of steam-pipe is desired the construction shown in Fig. 2 is preferable.

It will be understood that while my improved drier is intended, primarily, for drying fish it is also well adapted for drying other articles and materials, and it may be used for all purposes to which it is adapted. Furthermore, my invention, generically considered, is not limited to fans having the special construction shown in the drawings, as other forms of fans or blowers may be employed.

That which I claim as my invention, and desire to secure by Letters Patent, is—

1. In a drier, the combination of carrier mechanism adapted to carry the articles to be dried, a plurality of blower-casings arranged with their ends in juxtaposition, said carrier mechanism being arranged in the air-currents caused by said blowers, and air-inlets between the ends of adjacent blowers, substantially as described.

2. In a drier, the combination of carrier mechanism adapted to carry the articles to be dried, a plurality of blower-casings arranged with their ends in juxtaposition, said carrier mechanism being arranged in the air-currents caused by said blowers, air-inlets between the ends of adjacent blowers, and means for heating the air, substantially as described.

3. In a drier, the combination of blower-casings arranged in line, a shaft extending into a plurality of said casings, fans operated by said shaft, and conveyer mechanism in the path of the air-currents caused by said blowers, substantially as described.

4. In a drier, the combination of blower-casings arranged in line, a shaft extending into a plurality of said casings, fans operated by said shaft, conveyer mechanism in the path of the air-currents caused by said blowers, and a bearing for said shaft between the ends of adjacent casings, substantially as described.

5. In a drier, the combination of blower-casings arranged in line, a shaft extending into a plurality of said casings, fans operated by said shaft, conveyer mechanism in the path of the air-currents caused by said blowers, a bearing for said shaft between the ends of adjacent casings, and a covering connecting the ends of adjacent casings and partially inclosing said bearing, substantially as described.

6. In a drier, the combination of a plurality of blowers, air-inlets between the ends of adjacent blowers, means for heating the air, and conveyer mechanism arranged in the path of the heated air, substantially as described.

7. In a drier, the combination of a series of blower-casings arranged in line, a shaft extending through a plurality of said casings, fans mounted on said shaft, openings for admitting air to said blowers, and conveyer mechanism in the path of the air discharged from said blowers, substantially as described.

8. In a drier, the combination of a series of blower-casings arranged in line, a shaft extending through a plurality of said casings, fans mounted on said shaft, openings for admitting air to said blowers, conveyer mechanism in the path of the air discharged from said blowers, and means for heating the air, substantially as described.

CHARLES H. EMERY.

Witnesses:
JOHN L. JACKSON,
A. H. ADAMS.